Patented Nov. 20, 1951

2,575,954

UNITED STATES PATENT OFFICE 2,575,954

PREPARATION OF 1,2-DIHYDRO-PYRIDAZINE-3,6-DIONE

Walter D. Harris and Dwight L. Schoene, Naugatuck, Conn., assignors to United States Rubber Company, New York, N. Y., a corporation of New Jersey No Drawing. Application January 25, 1950, Serial No. 140,558

9 Claims. (Cl. 260—250)

This invention is concerned with a new and improved preparation of 1,2-dihydropyridazine-3,6-dione. This compound was first described by Curtius and Foesterling (J. Pr. Chem., 1895, 51, 371) who prepared it by reacting maleic anhydride with hydrazine hydrate in alcohol. A number of products were obtained and a troublesome separation was required to isolate the desired material. They also stated that acetic acid could be used as a solvent in this synthesis but gave no experimental details. Very little other work describing its preparation has been recorded.

The synthesis using alcohol is of doubtful practical value because of the by-products. We have examined the acetic acid method in some detail and have been able to achieve yields in the range of 70–75% of theory by refluxing hydrazine or hydrazine hydrate in acetic acid with maleic anhydride. However, this solvent is expensive and corrosive as are hydrazine and its hydrate. The process leaves much to be desired with respect to reaction cycle and purity of product.

We have discovered that it is possible to overcome many of these objections by reacting either maleic anhydride or maleic acid with hydrazine salts of strong inorganic acids. Excellent yields of a very high grade product are obtained. The inorganic acid salts of hydrazine are easy to handle in contrast to the difficulty of handling hydrazine and its hydrate which are liquids.

We prefer to employ water as a reaction medium in the practice of our invention. The use of water in place of an organic solvent is safer, cheaper, much more convenient and, in addition, gives an improved product.

In the practice of our invention, we can use hydrazine salts of any strong inorganic acid. Illustrative and non-limiting examples of such acids are sulfuric, phosphoric, pyrophosphoric, nitric, hydrochloric and hydrobromic acids. The most highly preferred acids are sulfuric and hydrochloric and hydrobromic. Phosphoric acid works but is not nearly as good as the stronger acids. Nitric acid is not desirable because of difficulty of handling and danger of explosion. Those skilled in the art know which inorganic acids are strong and which are weak. Specifically, for the purposes of this description, the strong inorganic acids may be defined as those which have a dissociation constant of at least $1.1 \times 10^{-2}$. The dissociation constant of an acid (see for example pages 1354–1355 of Handbook of Chemistry and Physics, 27th edition) is measured at ordinary room temperature, say 18° C. or 25° C. In the case of a polybasic acid the value for the first hydrogen is intended. The inorganic acids may also be classified into strong and weak acids in the several ways suggested on pages 237–239 of "Mellor's Modern Inorganic Chemistry," Parkes' edition, Longmans, Green & Co., 1939. The strong acids are those having a strength value of at least 7.3 relative to hydrochloric acid rated at 100, when measured by Thomsen's thermal method, the ester hydrolysis method or the conductivity method there described. On this rating, we prefer to use an acid at least as strong as sulfuric acid which is shown as having a strength value of 49 to 65.1 compared to 100 for hydrochloric acid.

The reaction of our invention may be carried out quite simply by stirring solid maleic anhydride into an aqueous solution of a stoichiometric amount of the hydrazine salt. The solution soon becomes cloudy and a temperature increase is noted. The solution may then be refluxed, or heated at a temperature just below the refluxing temperature, for a short time, cooled, and the product filtered, washed with water and dried. Water serves to moderate the reaction, and to provide for easy heat transfer, ease of mixing, and the like. As mentioned previously, water also results in a better product. While we much prefer to carry out the reaction in the presence of water, we have found that the reaction can be effected by heating the dry components, viz., maleic acid or anhydride and the hydrazine salt of the strong inorganic acid, such a procedure will give the same products; alternatively, these reactants may be heated in a non-solvent such as benzene to effect the reaction. Water is preferred, however, because of its cheapness.

It is preferred to employ approximately stoichiometric amounts of the reactants, i. e., approximately one mol of maleic acid or anhydride per mol of hydrazine in the form of the salt of the strong inorganic acid. Thus, if the mono hydrazine salt (obtained from one mol of hydrazine per mol of acid) is used, we use one mol of maleic acid or anhydride per mol of such salt. In the case of dihydrazine salts (which are made from 2 mols of hydrazine per mol of acid), we employ 2 mols of maleic acid or anhydride per mol of such salt.

Generally speaking, we practice the method of our invention by commingling the reactants and thereafter heating to an elevated temperature, typically ranging from 75° C. to 110° C. until the reaction has attained the degree of completion. Upon cooling, the product precipitates from the mixture when an aqueous reaction medium is employed, and is readily recovered therefrom by filtration and washing.

It was unexpected that the conditions outlined above should produce 1,2-dihydropyridazine-3,6-dione. As seen in the following equation for the reaction of maleic anhydride with dihydrazine sulfate in accordance with our invention,

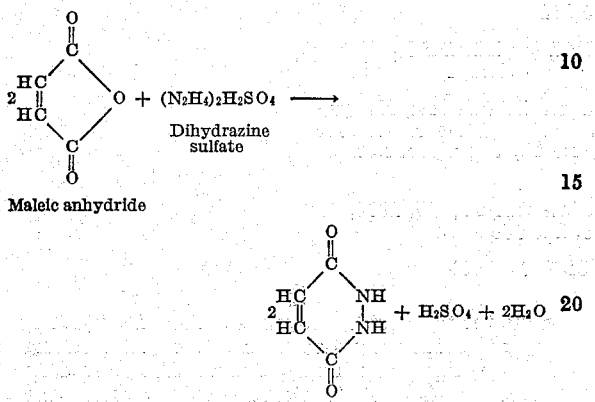

this is a condensation reaction in which water is eliminated; hence it would be expected that water would not be a particularly good solvent to carry out the reaction. It should also be noted that a strong acid, sulfuric in this example, is also eliminated by the relatively weak organic acid. Therefore, as the reaction proceeds the solution becomes strongly acid. It is well known that dilute aqueous solutions of inorganic acids are excellent as hydrolyzing media for amides. It is most surprising that 1,2-dihydropyridazine-3,6-dione, which is in a sense a diamide, should form under these conditions.

The strong inorganic acid appears to be the most critical part of our new process. In most other processes yellow by-products are formed to an objectionable extent. Their nature is not known, but it is not unlikely that they include the addition products of hydrazine to the double bond of the maleic anhydride or maleic acid. Such reactions are known to occur with maleic derivatives, particularly under alkaline conditions. It seems possible that the strong inorganic acid serves in some manner to suppress the side reactions, thus permitting a better yield of a purer product. It is noteworthy that by our process the product is usually a snow-white crystalline solid in contrast to the off-white or yellow products of other processes.

We have attempted the manufacture of 1,2-dihydropyridazine-3,6-dione by reacting maleic anhydride with hydrazine in water and by reacting maleic anhydride with hydrazine acetate in water. In both cases, however, the yields were only 50–60% and the products were yellow as were the supernatant solutions.

The following examples illustrate our invention in more detail.

*Example I.—From maleic anhydride and dihydrazine sulfate*

Technical dihydrazine sulfate (810 g.=5.0 mols) was dissolved in 3 liters of warm water. This solution was stirred vigorously while maleic anhydride (980 g.=10.0 mols) was added rapidly. An immediate reaction set in as evidenced by a cloudy appearance and a rise in temperature from 33° C. at the beginning to 56° C. at the end of the addition. The reaction mixture was then heated as rapidly as possible by a glass heating mantle, to a temperature just short of reflux. This temperature was maintained for 3½ hours. The mixture was light yellow at first, darkened somewhat and thickened a great deal at about 66° C. At 72° C. it became quite fluid. The color decreased gradually until it almost completely disappeared after about 30 minutes at the highest temperature. Stirring was continued and the flask was cooled to 25° C. in a cold water bath. The product was collected by vacuum filtration, washed free of sulfate and dried. The product was a snow-white, coarse crystalline solid. Yield 960 g. or 85.6% of theory. It melts with decomposition at 305–308° C. An authentic sample prepared by the acetic acid process melted at 303–305° C. with decomposition. The mixed melting point of the two was the same as the authentic sample.

*Example II.—From maleic acid and dihydrazine sulfate*

In this example the maleic anhydride (19.6 g., 0.2 mol) was first hydrolyzed by heating for a few minutes in 50 cc. of water. To this solution was added a solution of dihydrazine sulfate (16.2 g., 0.1 mol) in 50 cc. water. An additional 50 cc. of water was added and the mixture was boiled for about 1 hour. The reaction mixture was allowed to cool, filtered, washed several times with cold water and dried. A 16.8 g. yield of white, dense crystals which melted at about 286° C. with decomposition was obtained.

*Example III.—From maleic acid and hydrazine sulfate*

This example was carried out in the same manner as Example II except that 26 g. (0.2 mol) of mono hydrazine sulfate was employed instead of the dihydrazine sulfate. The yield was 17 g. and the melting point was 305° C.

*Example IV.—From maleic anhydride and hydrazine hydrochloride*

To a heated solution containing 300 cc. water, 32 g. (1 mol) of hydrazine, and 100 cc. concentrated hydrochloric acid was added 98 g. (1 mol) of maleic anhydride. The temperature was 65° C. when all the anhydride had dissolved. A copious white precipitate formed almost at once. The mixture was boiled for one hour, cooled, filtered, washed well with cold water and dried. Yield 97.3 g. (86.8% of theory); M. P. 305° C.

*Example V.—From hydrazine phosphate and maleic anhydride*

A solution containing 55 g. (0.5 mol) of 90% phosphoric acid, 300 cc. of water and 32 g. (1 mol) of hydrazine was heated almost to boiling and 98 g. of maleic anhydride was added. A very rapid reaction ensued, the mixture becoming a heavy slurry momentarily, then thinning to a readily stirred slurry. Heating was continued for 2 hours in a boiling water bath. This mixture was first quite yellow but gradually lightened. The mixture was cooled, filtered, washed with cold water and dried. The product was light yellow. It melted at 302–304° C. From this experiment we conclude that while hydrazine salts of phosphoric acid will work in our invention, they are not nearly as satisfactory as hydrazine salts of stronger acids such as sulfuric and hydrochloric with which no yellowing occurs and which yield a perfectly white product.

The amount of water used as the reaction medium in the preferred practice of our invention should be at least sufficient to dissolve all of the hydrazine salt of the strong inorganic acid and may be sufficiently in excess of this amount to dissolve all of the maleic acid or maleic anhydride. It is preferred to employ as little water as is consistent with good results, in order to increase productivity and reduce handling costs and loss of valuable product in solution in water.

As used in the claims, the term "maleic acid" is intended to include both the acid and its anhydride, these being well understood to be substantial chemical equivalents. However, we prefer to use maleic anhydride rather than maleic acid in the practice of our invention.

Having thus described our invention, what we claim and desire to protect by Letters Patent is:

1. A method of making 1,2-dihydropyridazine-3,6-dione which consists in reacting maleic acid with a hydrazine salt of a strong inorganic acid in water as a reaction medium.

2. A method of making 1,2-dihydropyridazine-3,6-dione which consists in commingling solid maleic anhydride with an aqueous solution of a hydrazine salt of a strong inorganic acid, heating the resulting mixture to an elevated temperature, cooling the resulting mixture and thereby causing the 1,2-dihydropyridazine-3,6-dione product to precipitate, and separating the precipitated 1,2-dihydropyridazine-3,6-dione product from the cooled mixture.

3. A method of making 1,2-dihydropyridazine-3,6-dione which consists in reacting maleic acid with a hydrazine salt of sulfuric acid in water as a reaction medium.

4. A method of making 1,2-dihydropyridazine-3,6-dione which consists in reacting maleic acid with dihydrazine sulfate in water as a reaction medium.

5. A method of making 1,2-dihydropyridazine-3,6-dione which consists in reacting maleic acid with a hydrazine salt of hydrochloric acid in water as a reaction medium.

6. A method of making 1,2-dihydropyridazine-3,6-dione which consists in reacting maleic acid with mono hydrazine sulfate in water as a reaction medium.

7. The method of making 1,2-dihydropyridazine-3,6-dione which consists in bringing together a compound selected from the group consisting of maleic acid and maleic anhydride and a hydrazine salt of a strong inorganic acid in water as a reaction medium, said water being present in amount sufficiently great to dissolve all of said hydrazine salt, heating the resulting aqueous mixture at from 75° C. to 110° C. to complete the reaction, cooling the resulting aqueous reaction mixture and thereby causing the 1,2-dihydropyridazine-3,6-dione product to precipitate, and separating said precipitated 1,2-dihydropyridazine-3,6-dione product from the cooled mixture.

8. The method of claim 7 wherein said compound is maleic anhydride.

9. The method of claim 7 wherein said compound is maleic anhydride and wherein said hydrazine salt is dihydrazine sulfate.

WALTER D. HARRIS.
DWIGHT L. SCHOENE.

REFERENCES CITED

The following references are of record in the file of this patent:

UNITED STATES PATENTS

| Number | Name | Date |
|---|---|---|
| 2,453,578 | Lacey et al. | Nov. 9, 1948 |

OTHER REFERENCES

Science, 109, pp. 588–590 (1949).